United States Patent [19]

Ryan

[11] Patent Number: 5,513,260
[45] Date of Patent: Apr. 30, 1996

[54] METHOD AND APPARATUS FOR COPY PROTECTION FOR VARIOUS RECORDING MEDIA

[75] Inventor: John O. Ryan, Cupertino, Calif.

[73] Assignee: Macrovision Corporation, Sunnyvale, Calif.

[21] Appl. No.: 267,635

[22] Filed: Jun. 29, 1994

[51] Int. Cl.$^6$ .............................. G11B 23/28; H04L 9/30
[52] U.S. Cl. .................................. 380/3; 380/5; 380/22; 369/44.33
[58] Field of Search ................................. 380/3, 4, 5, 23, 380/25; 369/44.26, 44.33

[56] References Cited

U.S. PATENT DOCUMENTS

| | | | |
|---|---|---|---|
| 4,670,857 | 6/1987 | Rackman | 380/4 |
| 4,785,361 | 11/1988 | Brotby | 380/4 X |
| 4,866,769 | 9/1989 | Karp | 380/4 |
| 4,891,504 | 1/1990 | Gupta | 360/60 |
| 5,159,633 | 10/1992 | Nakamura | 380/30 |
| 5,379,433 | 1/1995 | Yamagishi | 380/4 X |
| 5,412,718 | 5/1995 | Narasimhalu et al. | 380/4 |
| 5,418,852 | 5/1995 | Itami et al. | 380/4 |

Primary Examiner—Gilberto Barrón, Jr.
Attorney, Agent, or Firm—Gerow D. Brill

[57] ABSTRACT

A method and apparatus for copyright protection for various recording media such as compact discs (CDs) uses a combination of symmetrical and asymmetrical data encryption to permit the player to handle either copy-protected or non-copy-protected media, in a manner that is extremely difficult to compromise. Coupled with the combination of encrypting methods, an Authenticating Signature is recorded on the media only when copy-protection is required. The nature of this Authenticating Signature is such that it will not be transferred to illicit copies made on CD recorders. When either an original protected or an original non-protected disk is played, the presence or absence of the Authenticating Signature causes the player to correctly decrypt the program data. All original CDs therefore play normally. When a copy of a non-protected CD is played, the absence of the Authenticating Signature also causes the player to correctly decrypt the program data. However, when a copy of a protected CD is played, the absence of the Authenticating Signature causes the player to generate false data which prohibits the disk from playing normally.

25 Claims, 2 Drawing Sheets

DISK MASTERING ARRANGEMENT

DISK MASTERING ARRANGEMENT

CD PLAYER ARRANGEMENT

METHOD AND APPARATUS FOR COPY PROTECTION FOR VARIOUS RECORDING MEDIA

BACKGROUND

The optical compact disc (CD) is universally recognized as a superb medium for storage of digital data. Its high packing density, low manufacturing cost and relative immunity to mishandling are unmatched by other media. The success of the CD as a carrier of high fidelity audio is likely to be repeated in the realm of Multimedia, where the technology has been adapted to the broader task of storing digitized audio, video and alphanumeric information for a variety of purposes, conforming to a plethora of standards such as CD-ROM, CD-Video, CD-I, etc.

To date, CD ROM software copyright owners have not had to contend with the rampant piracy (unauthorized copying) that afflicts the videocassette and audiocassette media. This is almost entirely due to the large capital investment costs associated with mastering and replicating CDs, which creates substantial financial barriers to piracy. However, compact disc recording machines capable of making perfect copies of data from pre-recorded CDs are now available for professional users for about two thousand dollars and it is very likely that a few years from now, consumer affordable player-recorders will be widely available. This will create a serious conflict between software producers' needs to sell their product for $50+ to make a profit, and the consumers' resulting ability to make a perfect copy for the price of a blank disc, projected to be in the $10 to $20 range soon. The problem is likely to be much more severe than the piracy afflicting the video business, because, while few people want to watch a movie more than once, many Multimedia software products are intended to be used repeatedly, so that ownership rather than rental is likely to be the norm.

The fundamental problem solved by this invention is to ensure that consumers can only enjoy a software manufacturer's products by playing legitimately manufactured CDs.

One approach to this piracy problem would be the inclusion of special anti-copy circuitry within CD-recorders, mandated by general agreement between the manufacturers, similar to the Serial Copy Management System (SCMS) developed for the Digital Audio Tape (DAT) medium. With this scheme the CD-recorder would look for a special copy-prohibit instruction in the digital data and on finding it, would stop recording. However, such a system offers very limited protection. Even when the SCMS system was first proposed for the DAT medium, it was fully appreciated that it presented little protection from professional or even amateur pirates, who, knowing the data format, could, and subsequently did, build inexpensive "black boxes" (electronic circuits) to remove the copy-prohibit instruction thereby enabling the recorders to make unlimited copies.

The applicant believes that all anti-copy systems relying on copy-prohibit instructions inserted in the data stream can be defeated by black boxes of the same order of complexity and cost as that of the circuitry within the CD-recorder that looks for these instructions. Such systems are therefore of limited effectiveness. The black box would be connected in line between a CD-player and a CD-recorder and would look for the special copy-prohibit instructions in the data stream and simply remove or modify these instructions. It is to be expected therefore that if this kind of anti-copy system were adopted, inexpensive black boxes would proliferate.

A further difficulty with this approach to copy protection is the need to ensure that all CD-recorder manufacturers include the necessary detection circuitry in their products. Some manufacturers may not comply, perhaps in the expectation of increasing their market share. The presence of even a small percentage of non-complying machines in the marketplace could jeopardize the viability of this type of copy-protection scheme.

For the foregoing reasons, there is a need for a copy-protection system for the compact disc medium that provides a high level of protection to software rights owners, that is immune to black boxes and that is not compromised by the refusal of a few hardware manufacturers to comply with the standard.

SUMMARY OF THE INVENTION

According to the invention, a Conditional Play System provides copyright protection for previously recorded material on various media, for example compact disc media. Since the invention to be described is applicable to many different media and one of average skill in the art could readily adapt the teachings of this invention to other media, the description which follows will describe its application to the compact disk medium only.

The invention overcomes the disadvantages of the above-described system. The Conditional Play System does not attempt to prevent CD-recorders from copying the data from protected CDs. Instead, it is a method by which CD-players can determine whether a particular CD is a legitimate original or an illicit copy. If legitimate, the player plays the CD normally. If not, the player shuts down and may display an appropriate copyright warning message.

During manufacture of the master disk, an Authenticating Signature is impressed on the disc in a manner that cannot be read by a CD-player's normal optical pickup, but which can easily be detected by other means. The nature of this Authenticating Signature is such that it is faithfully transferred to all production disks made from this master. However, if an illicit copy of a production disk is made using a CD-recorder, the copy may contain a faithful replica of the disk's program data, but the Authenticating Signature is not transferred to the copy. All CD-players conforming to this copy protection standard would include a subsystem to search for the Authenticating Signature. If the signature is not found, the CD-player will not play the disk.

For compact disk applications, the Authenticating Signature is preferably impressed on the master disk by radially position modulating the writing head that creates the master disk by a few tens of nanometers peak-to-peak about the head's normal position. This Authenticating Signature can then be read in the CD-player with a minimal increase in player complexity by taking advantage of the player's existing radial tracking servo system, as will now be described.

In all CD-players, the optical reading head is maintained on track by a sophisticated error detection system, as a normal part of the player's function. If for example the head moves slightly toward one or other side of the track, or the track moves from under the head due to an off center spindle, an error is detected and, after amplification, is applied to the radial actuator to re-center the head on the track. Since the optical reading head must also track a deliberately induced radial position-modulation defining an Authenticating Signature, this error voltage therefore contains a signal component corresponding to this, along with other signals corresponding to elliptical errors and the like. Therefore by appropriate processing of this error voltage, the Authenticating Signature can be detected.

The position-modulation signal may be a simple sinusoid of frequency such that either an integral number of cycles is impressed during each revolution of the disk, or one complete cycle is impressed during an integral number of revolutions of the disk. In either case, extraction of the Authenticating Signature from the various other tracking error signals is simplified. A relevant type of abnormal scanning is described in U.S. Pat. No. 5,247,507 by Morimoto (incorporated by reference) that describes a wobble of the normal tracking signal causing the tracking to meander in a sinusoidal path about a mean frequency.

Clearly this copy protection system cannot be compromised by any external black box connected between a CD-player's signal output and a CD-recorder's signal input, since the Authenticating Signature is not transferred to the recorder.

Neither is the system compromised if a few manufacturers choose not to build the authenticating systems into their CD-players, because pirate disk makers would have to label their products as capable of being played only on the limited set of non-complying CD-players on the market. The pirate disk maker would in effect be advertising the illegality of their product and inviting prosecution.

Three forms of such a Conditional Play System are described herein. A common element of all three Conditional Play Systems is the use of the special Authenticating Signature described above, which is impressed on legitimately manufactured CDs or other media, in a manner such that this Authenticating Signature is not part of the recorded "program" signal and is therefore not passed on to an illicit copy.

The first of these Conditional Play Systems requires that all CD players conforming to the particular standard in question—CD-ROM, for example—must look for an Authenticating Signature on each individual CD to be played. The CD player's control system would be designed to stop playing the CD if the Authenticating Signature were missing. Since, as stated earlier, an illicit copy of a CD would not have the Authenticating Signature, such copies would in effect be useless. Effective copy-protection is therefore accomplished even though the illicit copy may contain a perfect replica of the program information.

The disadvantage of this first system is that all legitimate CDs which are intended to be played on these special CD-players must have an Authenticating Signature added. This system is therefore only suitable for closed systems wherein a systems controller can mandate that all CDs be copy-protected. However, it is desirable from a commercialization viewpoint to be able to offer and charge for copy-protection on a program by program basis. The second and third Conditional Play Systems to be described below have this capability.

In a second Conditional Play System, CDs to be copy-protected would contain a special instruction to tell all CD-players to look for the Authenticating Signature and to not play such CDs in the absence thereof. The instruction could be recorded, for example, on the initialization section of the CD—the part normally reserved for non-program information. The instruction would be acted upon by a special sub-system in all compliant CD-players. Thus, only originals of copy-protected CDs could be played—illicit copies would be rejected. This instruction would be omitted from CDs of programs which did not require copy-protection and for such programs both original CDs and copies thereof would play normally. In this manner copy-protection could be offered on a program by program basis through the use or non-use of this "Look For An Authenticating Signature And Play Only If Found" instruction.

However, although this second Conditional Play System allows the copy-protection feature to be offered on a program by program basis, it could in principle be compromised by special black boxes connected in the signal line between the CD-player and the CD-recorder. These black boxes would search for this "Look For . . . " instruction in the data stream from the CD-player and remove or modify it so that the resultant illicit copy would not trigger the authenticating procedure in CD-players.

A third Conditional Play System, called the Programmable Conditional Play System (PCPS) overcomes the disadvantages of the above described systems and provides a copy-protection scheme which can be activated on a program by program basis and which is also highly resistant to black box attack.

The description below describes one embodiment of the Programmable Conditional Play System that uses a combination of symmetrical and asymmetrical encryption techniques to achieve its goal.

DETAILED DESCRIPTION OF THE INVENTION

The present invention relates to a method and apparatus for copy-protecting various program distribution media, such as the compact disk medium. This invention is applicable to all disk media and the principles may be extended by one of ordinary skill in the art to other media such as magnetic tape. The invention offers a high level of protection to software rights owners, is immune to black boxes and will not be compromised by the refusal of a few hardware manufacturers to comply with the standard.

As mentioned earlier, it is desirable to be able to offer copy-protection to copyright holders on a program-by-program basis and to receive a per-program fee or a per-disk fee in return. This is accomplished in the Programmable Conditional Play System using a combination of symmetrical and asymmetrical (also known as public-key) data encryption to permit the CD-player to handle either copy protected or non-copy-protected disks in a manner that is extremely difficult or prohibitively expensive and time consuming to compromise, using black boxes.

A summary of conventional encryption methods is useful for a fuller understanding of this invention. The most common form of data encryption, called symmetrical encryption, uses the same key to encrypt and decrypt the data. To guard against trial and error attempts at guessing the key, the key is preferably a very large randomly generated number that is changed from time to time. For example the key might be a number such as 349,247,839,636,290,351, 673. This number (the key) would normally be kept secret to ensure system integrity. The need to keep the key secret is a major disadvantage of symmetrical encryption systems. The commonly used DES algorithm is an example of a symmetrical encryption system in which digital words, arranged in 64 bit blocks, are encrypted using a 56 bit key. 56 binary bits are equivalent to about 17 decimal digits.

Asymmetrical encryption systems use two different keys, which we may call P and Q. One key P, is used for encryption and the other key Q, is used for decryption. An important advantage of asymmetrical systems is that a knowledge of the key Q used for decryption is insufficient to allow messages to be encrypted. Presently, one of the most secure algorithms for asymmetrical encryption is that designed by RSA Data Security Inc., (RSA) using the technology of U.S. Pat. No. 4,405,829 by Rivest et al. The security of this system rests on the tenet that it is computationally difficult to calculate P from a knowledge of Q. The computation involves factoring extremely large numbers which may contain upwards of 500 digits. The more digits in the keys P and Q, the longer the factoring procedure takes. In practice, the sizes of the keys are chosen to reduce the possibility of factoring to acceptable levels during the life of the product, with due allowance for anticipated increases in computing power.

Figure 1:
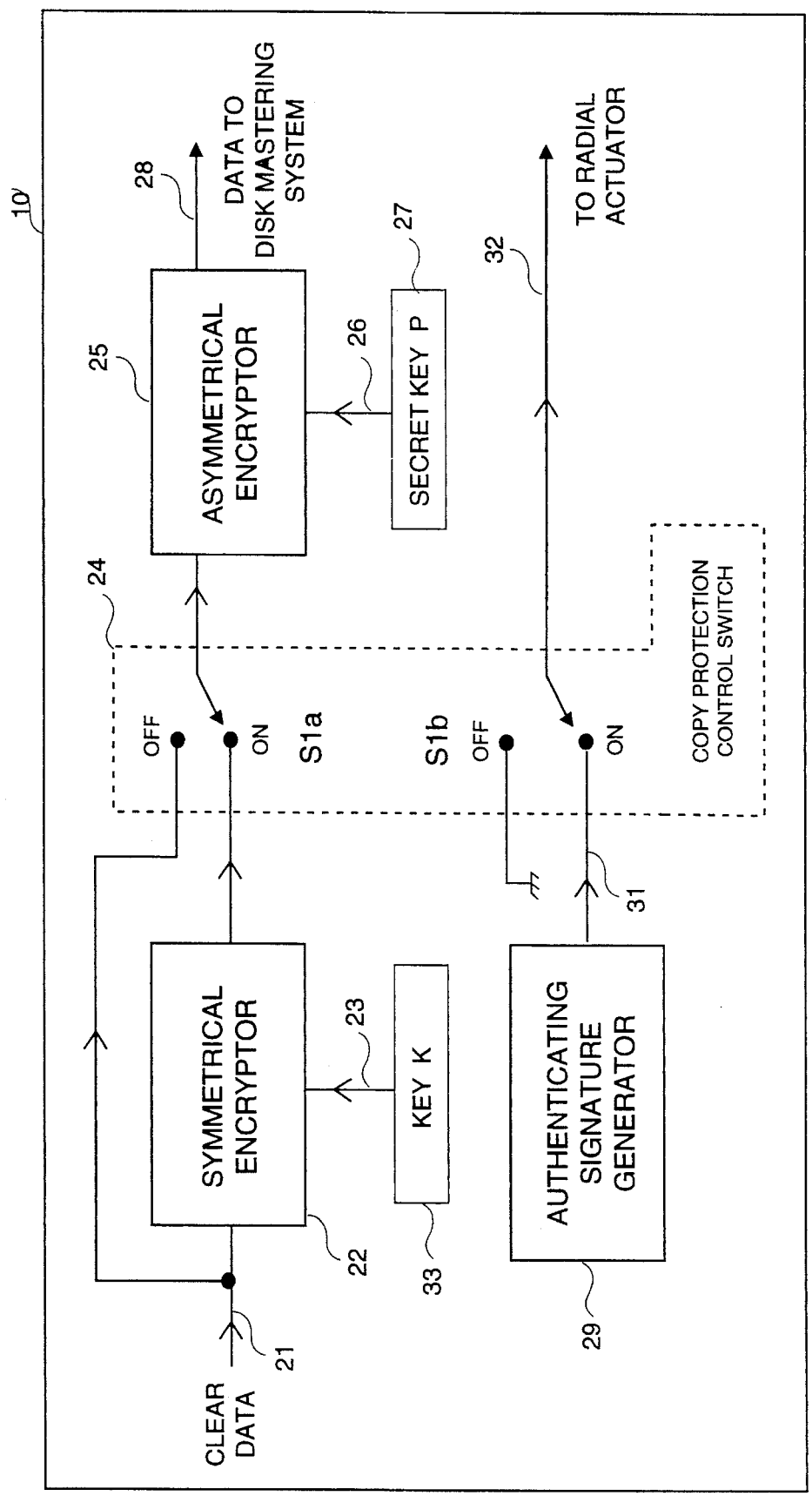
FIG. 1 is a block diagram of the mastering process hardware incorporating some elements of the invention.
Figure 2:
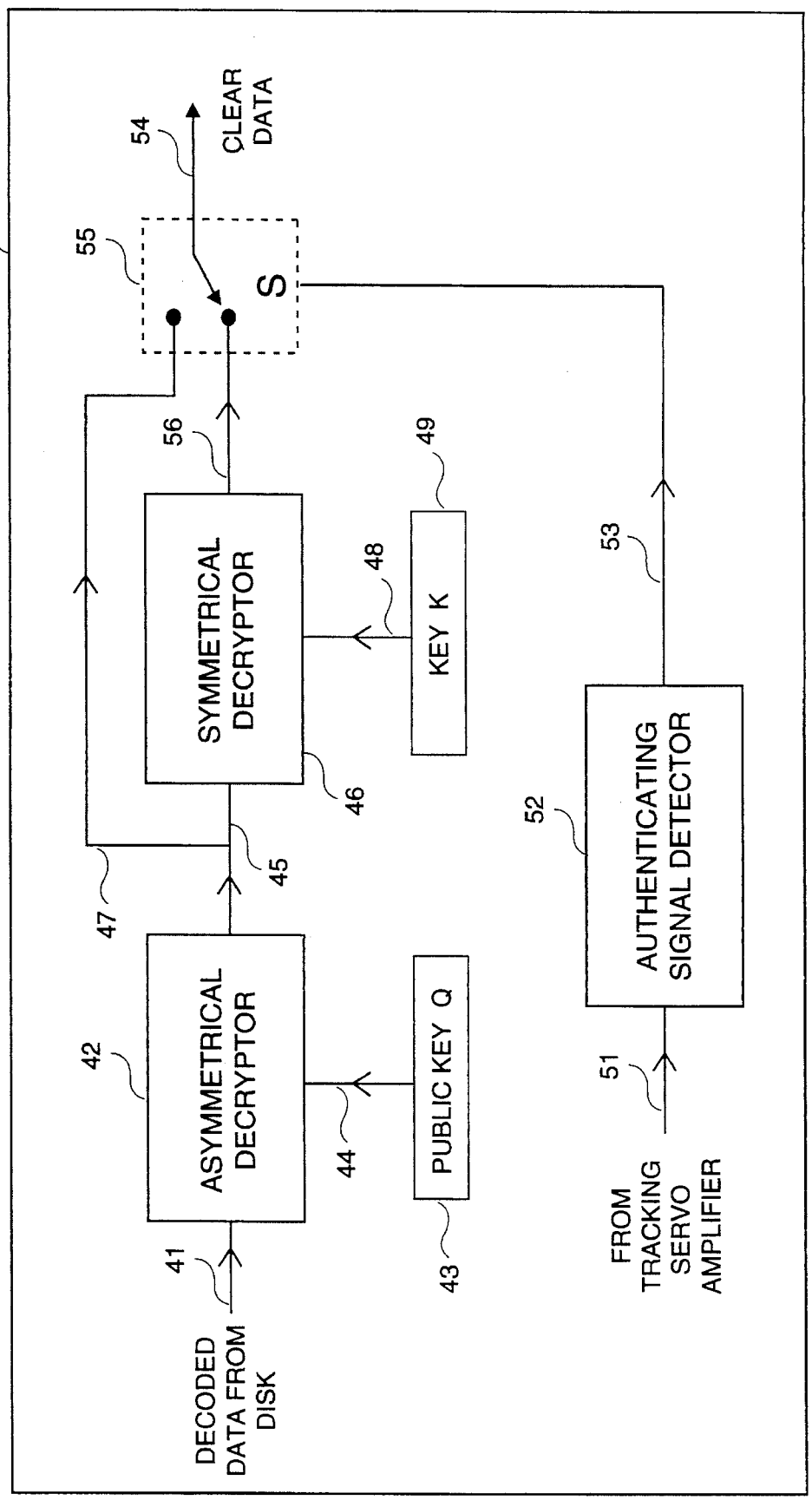
FIG. 2 is a block diagram of the compact disk playback device incorporating further elements of the invention.

A first embodiment of the PCPS encompasses a portion of a disk mastering device as in FIG. 1 and another portion in a CD-player, as in FIG. 2.

The PCPS Disk Mastering facility includes a copy protection recording apparatus 10 that accepts a "clear" (unencrypted) digital data stream from the conventional source, input terminal 21, that is inputted to both Symmetrical Encryptor 22 and an off position of one pole S1a of an operator controlled double pole single throw control switch, 24. By appropriately setting switch 24, an operator controls whether the CDs to be manufactured from the program input on line 21 will be copy protected or not. Symmetrical Encryptor 22 also receives key K on line 23, a first key signal, from key source 33.

The output of Symmetrical Encryptor 22 is an encrypted version of the clear digital data stream input on line 21. The type of encryption algorithm used by 22 and the nature of key K will be described later. To understand the invention it is sufficient to know that encryptor 22 modifies the clear data on line 21 according to some formula determined by key K. The output terminal of Symmetrical Encryptor 22 is coupled to the second input of switch S1a. The output of S1a is connected to the input of Asymmetrical Encryptor 25, part of a public key system.

To ensure the security of this Programmable Conditional Play System, the encrypting key P of the public key pair P,Q must be a closely guarded secret. To this end key P is preferably stored in a volatile memory in key source 27. This volatile memory may be within a physical enclosure that is protected in such a manner that an unauthorized attempt to read key P causes this memory to be erased and shuts down the system. Physical security systems capable of accomplishing this are well known in the art and need not be elaborated on herein.

Asymmetrically Encrypted Data on line 28 from Asymmetrical Encryptor 25 are connected to the data input portion of an otherwise conventional disc mastering device.

An Authentication Signature Generator 29 generates an Authenticating Signature 31 the nature and purpose of which was described earlier. Line 31 is connected to one input of S1b, the second pole of copy protection control switch 24. The other terminal of S1b has no signal applied and may be conventionally tied to ground. Operator controlled Switch S1b connects Authenticating Signature 31 to the radial actuator via line 32 only when the copy-protection mode is selected.

The companion copy-protection apparatus 40 contained within the CD-player, is shown in FIG. 2. Program data from the CD on line 41, appropriately decoded and error corrected, are inputted to Asymmetrical Decryptor 42 which is driven by the second key Q of the aforementioned public key pair P,Q. Key Q is provided on line 44 from key source 43. Asymmetrically Decrypted Data on line 45 is coupled to one input of switch 55, and also to the input of Symmetrical Decryptor 46. Symmetrical Decryptor 46 just performs the inverse of Symmetrical Encryptor 22 in FIG. 1, under control of the same key K which is provided on line 48 from key source 49.

The output of Symmetrical Decryptor 46 on line 56 is coupled to a second input of Switch 55. The output of Switch 55 on line 54 is coupled to the remaining conventional data processing portion of the CD-player. Keys Q and K are permanently stored in the CD-player in some convenient read only memory and no special security precautions are necessary. As will be explained later, a knowledge of these keys is of little help to a would-be pirate attempting to compromise this copy-protection scheme.

The error signal from the CD-player's radial tracking servo amplifier is input on line 51 to Authenticating Signal Detector 52. As explained earlier, this signal will have a component corresponding to the Authenticating Signature. Detector 52 is designed to generate a binary output on line 53 corresponding to the presence or absence of the Authenticating Signature at its input. For example this output may be a logical 1 in the presence of the Authenticating Signature and a logical 0 in its absence.

The logic levels are chosen so as to cause switch 55 to select the singly decrypted input from line 47 in the absence of an Authenticating Signature and the doubly decrypted input from line 56 when the Authenticating Signature is detected.

We can now appreciate the operation of this Programmable Conditional Play System by examining its response under different circumstances.

When an original copy-protected or non copy-protected disk is played, the presence or absence of the Authenticating Signature causes switch S to correctly select either the singly decrypted or the doubly decrypted data. The output of switch S will therefore be properly decrypted data. Consequently, all original disks will be played normally.

When a copy of a non copy-protected disk is played, the absence of the Authenticating Signature also causes switch S to correctly select the singly decrypted data, again allowing such disks to play normally.

However, when an illicit copy of a copy-protected disk is played, the absence of the Authenticating Signature causes switch S to incorrectly select the singly decrypted data. The partially decrypted data on line 54 will prohibit the disk from playing normally.

The security of the PCPS makes it very difficult if not impossible or uneconomical for a pirate to make playable copies of protected disks.

To make playable copies of copy-protected discs, i.e. to defeat this scheme, a pirate must do one of the following:

1. Convert the doubly encrypted program data recorded on all copy-protected disks to the singly encrypted format required by CD-players when the Authenticating Signature is missing. To do this, the pirate must obtain the Secret Key P used in the disk mastering process, which as explained earlier can be closely guarded within a sealed, booby trapped unit located at the disk mastering plant. The pirate can readily access the doubly encrypted off disk data inside a CD-player. He may also access the partially decrypted and fully decrypted (clear) program data, along with keys K and Q, inside a CD-player. However, the essence of the asymmetrical encryption method is such that a pirate still does not have enough information to deduce the secret key P needed to generate the required singly encrypted program data. This compound encryption scheme thus permits selective protection of programs and is immune to black box attack.

2. Add a viable Authenticating Signature to illicit copies as the disks are being recorded, so that compliant CD-players will play these disks normally. This is possible, but to do so the pirate needs to make major modifications to a CD-recorder to enable it to lay down radially position-modulated tracks. Such modifications are well beyond the capabilities of consumers and software dealers. However it is unrealistic to insist that a well-financed pirate operation could not find a way to do it. There are various ways to make it more difficult for a pirate to "forge" an Authenticating Signature, but these all depend to greater or lesser extent on the exact capabilities of the radial servo system (if any) on available CD-recorders. For example, the signature may be in the form of an impulse function (rather than a simple sinusoid), such that the radial servo of a commercially available CD-recorder might not be able to track it. Of course, if we allow this mythical pirate unlimited financial resources, he could invest in a professional disk mastering system and make the necessary modifications.

As a practical matter however, the ability of this system and method to eliminate piracy at the consumer, dealer and technically knowledgeable professional level, should be extremely valuable.

If the public key algorithm available from RSA Data Security Inc. (RSA), is used for the asymmetrical encryption and decryption in this application, it becomes possible to use an extremely simple symmetrical encryption and decryption algorithm without comprising security. Specifically this "algorithm" could simply invert any one bit of the data block or interchange any two such bits. Formal key-controlled encryption and decryption systems as conventionally understood can thus be avoided in favor of simple complementary logical operations. Keys K as used in the mastering process and in the CD-player would therefore be unnecessary.

A further simplification in the reduction to practice of this invention is possible by performing the various encryption and decryption procedures on a small subset of the program data, rather on the entire data stream. This is advantageous because it reduces the rate, in bits per second, at which the asymmetrical decryption subsystem needs to operate, thereby allowing the use of less expensive processors.

An alternative and equally effective method for authenticating a disk, is to couple one or more specific data blocks with specific radial distances from the center of the disk being mastered.

As the master disk is being cut, the writing head can be moved from the center at rates that vary randomly between nominal speed and fractionally more than nominal speed. The starting position of the head may also be displaced a random distance from the nominal starting position. The distance of particular data blocks from the disk's center and from each other will then be a function of these random variables. The values of these random variables are arranged to vary from program to program.

The distance of one or more data blocks from disk center is now encrypted under the private key of an asymmetrical encryption system and the encrypted data are recorded on the disk as part of the system data. When a CD-recorder makes a copy of such a disk, the distances of these data blocks from the CD's center on the copy differ from their distances on the original disk, because a commercially available CD-recorder's writing head is driven radially at a fixed speed.

Each companion CD-player would be provided with a calibrated radial servo system, such that the distance of the reading head from disk center would be available as a digital word within the player. When the CD is played, the encrypted radial distance data is decrypted using the public key Q of the key pair P, Q, which is stored in a memory in the CD-player. These decrypted data are temporarily stored in random access memory.

As the CD continues to play, the actual distance of the aforementioned data blocks is compared with the decrypted value of what the distance should be. Any difference in the computed distance deemed to be greater than that attributable to tolerance errors is presumed to being due to the CD being an illicit copy. The CD-player then stops playing and perhaps displays a copyright message.

As an alternative to using the distance of specific data blocks from the disc center and from each other as an indicator of a disc's authenticity, another embodiment uses a measurement of the radial velocity of the reading head at various data block locations. This approach has the advantage of not requiring the distance between the reading head and the disc center to be accurately known. Instead it relies on a relative measure of the head's radial velocity at various locations, which is more readily available from the tracking control system.

While the above embodiments have described a Programmable Conditional Play System for a compact disc format, the principles are also applicable to a magnetic tape format. For such applications, Authenticating Signature 32 could be added to the control track of the tape.

While the invention has been described in connection with preferred embodiments, it will be appreciated by those skilled in the art that various changes can be made without departing from its spirit. The coverage afforded applicant is defined by the claims and their equivalents.

I claim:

1. A method of providing copy-protection for a program distribution medium comprising the steps of:

adding an authenticating signature to media to be copy-protected;

passing program data through a first encryptor;

passing said first encrypted program data from said first encryptor through a second encryptor;

recording the data from the second encryptor on a media;

detecting the authenticating signature in a media player;

passing decoded data from said media through a first decryptor;

passing said first decrypted data from said first decryptor through a second decryptor;

selecting an output of said second decryptor when an authenticating signal is detected, and selecting an output of said first decryptor when an authenticating signature is not detected.

2. A method as recited in claim 1 wherein said first encryptor and said second decryptor are complementary.

3. A method as recited in claim 1 wherein said second encryptor and said first decryptor are complementary parts of an asymmetrical or public key encryption system.

4. A method as recited in claim 2 wherein said first encryptor is a device which inverts or interchanges one or more bits of the data block and said second decryptor performs the complementary logical operation.

5. A method for providing copy protection in a mastering process of a recording medium comprising the steps of:

inputting a data stream
generating a first key signal;
coupling said first key signal to a symmetrical encryptor;
coupling said data stream to said symmetrical encryptor
encrypting said data stream;
coupling said symmetrical encryptor to a selector;
coupling said data stream to said selector;
generating a second key signal;
coupling said second key signal to an asymmetrical encryptor;
selecting whether said data stream or symmetrically encrypted data is coupled to said asymmetrical encryptor;
asymmetrically encrypting data selected;
coupling asymmetrical encrypted data to a a data processing portion of a mastering device;
generating an authenticating signature signal; and
coupling said authenticating signature signal to a time base control mechanism of a disc mastering device when symmetrically encrypted data is coupled to said asymmetrical encryptor to modify said time base control mechanism according to said authenticating signature signal.

6. A method as recited in claim 5, wherein said recording medium is an optical compact disc.

7. A method as recited in claim 5, wherein said recording medium is a CD ROM disc.

8. A method as recited in claim 5, wherein said recording medium is a magnetic tape.

9. A method as recited in claim 5, wherein said first key signal is a random key.

10. A method as recited in claim 5, wherein said second key signal is a secret key.

11. A method as recited in claim 5, wherein said data stream is unencrypted.

12. A method for providing copy protection in a playback process of a previously recorded medium which may contain previously encrypted data in a playback device comprising the steps of:

providing previously encrypted data from said previously recorded medium;

generating a first key signal;

coupling said first key signal to an asymmetrical decryptor;

asymmetrically decrypting data from said previously recorded medium, thus producing a first decrypted data stream;

finding a second key signal from a key database;

generating a second key signal;

coupling said second key signal to a symmetrical decryptor;

coupling said first decrypted data stream to said symmetrical decryptor;

symmetrically decrypting said first decrypted data stream, thus producing a second decrypted data stream;

providing a servo signal which may contain an authenticating signal;

detecting a presence of said authenticating signal;

creating a copy protection signal based upon detection of said authenticating signal;

selecting said first decrypted data stream when a copy protection signal is not present;

selecting said second decrypted data stream when said copy protection signal is present; and outputting selected data to a data processing portion of said playback device.

13. A method as recited in claim 12 wherein said previously recorded medium is a CD ROM disc.

14. A method as recited in claim 12 wherein said previously recorded medium is a compact audio disc.

15. A method as recited in claim 12 wherein said previously recorded medium is a compact audio disc.

16. A copy protection recording apparatus for master recording on a recording medium comprising:

an input terminal for receiving a digital data stream;

a symmetrical encryptor;

a first random key generator to provide a first key signal, said first key signal coupled to said symmetrical encryptor;

an operator controlled switch thereby determines whether said digital data stream or output of said symmetrical encryptor is coupled to an asymmetrical encryptor;

a second key generator to provide a second key signal, said second key signal being coupled to said asymmetrical encryptor;

said asymmetrical encryptor being coupled to a data processing portion of a master recording device;

when said operator controlled switch is in an off position said digital data stream is asymmetrically encrypted by said asymmetrical encryptor;

an authenticating signature generator that generates an authenticating signature signal that indicates that a master recording is to be copy protected and said authenticating signature signal is coupled to a time base signal system; and wherein said authenticating signature signal is coupled to said time base signal system of said master recording device when said operator controlled switch is placed in an on position.

17. An apparatus as recited in claim 16 wherein said recording medium is a digital audio tape.

18. An apparatus as recited in claim 16 wherein said recording medium is a CD ROM disc.

19. An apparatus as recited in claim 16 wherein said recording medium is a compact audio disc.

20. An apparatus as recited in claim 16 wherein said time base signal system is a radial actuator system and said authenticating signature signal modulates a radial position of said radial actuator system during mastering.

21. An apparatus as recited in claim 20 wherein modulation of said radial actuator system comprises movement from a center of a disk being mastered at rates that vary randomly between a nominal speed and fractionally more than said nominal speed.

22. An apparatus for master recording copy protected material on a recording medium comprising:

means for coupling a digital data stream to a symmetrical encryptor;

means for generating a first key signal;

means for symmetrically encrypting said digital data stream using said first key signal;

means for coupling data to an asymmetrical encryptor;

means for selecting between said digital data stream and symmetrically encrypted data;

means for generating a second key signal;

means for asymmetrically encrypting selected data using said second key signal;

means for coupling asymmetrically decrypted data to a data processing portion of a master recording device;

means for generating an authentication signature signal to indicate that said digital data stream is to be copy protected;

means for selecting between a copy protection mode and a non-copy protect mode; and means for affecting a time base system of said recording medium in response to said authentication signature signal.

23. An apparatus as recited in claim 22 wherein said first key signal is a random key.

24. An apparatus as recited in claim 22 wherein said second key signal is a secret key.

25. A copy protection apparatus for a playback device, comprising:

means for coupling a decoded data signal to an asymmetrical decryptor;

means for generating a first key signal;

means for asymmetrically decrypting said decoded data signal by using said first key signal;

means for generating a second key signal;

means for coupling an asymmetrically decrypted data signal to a symmetrical decryptor;

means for symmetrically decrypting asymmetrically decrypted data using said second key signal to generate a clear data signal;

means for selecting between asymmetrically decrypted data from said asymmetrical decryptor and symmetrically decrypted data from said symmetrical decryptor;

means for detecting an authentication signature signal to indicate that said clear data signal is to be copy protected; and means for selecting between a copy protection mode and a non-copy protect mode for indicating whether said decoded data signal is copy protected or not copy protected.

\* \* \* \* \*